United States Patent
De La Puente Arrate et al.

(10) Patent No.: US 8,108,675 B2
(45) Date of Patent: Jan. 31, 2012

(54) EXTERNAL SIGNATURE DEVICE FOR A PC WITH WIRELESS COMMUNICATION CAPACITY

(75) Inventors: Fernando De La Puente Arrate, Las Palmas de Gran Canaria (ES); Juan Domingo Sandoval Gonzalez, Las Palmas de Gran Canaria (ES); Pablo Pons Bordes, Las Palmas de Gran Canaria (ES); Claudio Jesus Molina Gil, Las Palmas de Gran Canaria (ES)

(73) Assignee: Inelcan, S.L., Las Palmas de Gran Carnaria (ES)

( * ) Notice: Subject to any disclaimer, the term of this patent is extended or adjusted under 35 U.S.C. 154(b) by 323 days.

(21) Appl. No.: 12/300,292

(22) PCT Filed: May 11, 2007
(Under 37 CFR 1.47)

(86) PCT No.: PCT/ES2007/000280
§ 371 (c)(1),
(2), (4) Date: Jun. 5, 2009

(87) PCT Pub. No.: WO2007/132046
PCT Pub. Date: Nov. 22, 2007

(65) Prior Publication Data
US 2010/0287376 A1    Nov. 11, 2010

(30) Foreign Application Priority Data
May 11, 2006    (ES) .................... 200601210

(51) Int. Cl.
*H04L 9/32* (2006.01)
*H04L 9/00* (2006.01)
*H04L 9/30* (2006.01)
*H04K 1/00* (2006.01)

(52) U.S. Cl. .................. 713/170; 713/176; 380/30

(58) Field of Classification Search .............. 713/170, 713/176; 380/30
See application file for complete search history.

(56) References Cited

U.S. PATENT DOCUMENTS

| | | | |
|---|---|---|---|
| 2002/0152386 A1* | 10/2002 | De La Puente arrate et al. | 713/176 |
| 2002/0178125 A1* | 11/2002 | Weigel | 705/75 |
| 2003/0014632 A1 | 1/2003 | Vanstone et al. | |
| 2005/0066057 A1* | 3/2005 | Thorstensson et al. | 709/246 |

FOREIGN PATENT DOCUMENTS

| | | | |
|---|---|---|---|
| ES | 2167245 A1 | 5/2002 | |
| ES | 2173652 T3 | 10/2002 | |
| WO | WO 03034772 A1 | 4/2003 | |

* cited by examiner

*Primary Examiner* — Kambiz Zand
*Assistant Examiner* — Aubrey Wyszynski
(74) *Attorney, Agent, or Firm* — Arent Fox LLP

(57) ABSTRACT

External signature device for a PC, with capacity for wireless communication with the computer, which can be used immediately in electronic banking and electronic commerce or in any other system based on electronic signature requiring a high level of security with a relatively small amount of data for signature, said device including a communication interface with wireless connection to the PC, an alphanumeric display (2) for displaying the data for signature, a keyboard (1) for user interaction with the device, a signature system responsible for processing the operations relating to signature of the data received, and an internal battery (4).

6 Claims, 1 Drawing Sheet

EXTERNAL SIGNATURE DEVICE FOR A PC WITH WIRELESS COMMUNICATION CAPACITY

This application is a National Stage entry of International Application No. PCT/ES2007/000280, filed May 11, 2007, the entire specification and claims of which are incorporated herewith by reference.

OBJECT OF THE INVENTION

This invention is an external signature device for a PC, which is equipped with a wireless communication interface, which provides certain essentially novel characteristics and notable advantages when compared to other known devices that are used for these same purposes in the current state of the art when this technology is concerned.

To be specific, the invention proposes a signature device of the universal type, which can be used in combination with any kind of computer that is equipped with a compatible wireless communication interface. It is a small electronic device (it can fit in the palm of one's hand) that is provided with electronic signature functions with public encoding and is likewise equipped with a display and its own keyboard, which the users can use to securely validate the data that have to be signed. The wireless communication enables the user to receive the data that have to be signed from the personal computer to the to the signature device and to send the signature that has been generated for those items of data. The system is equipped with operational security characteristics that have been greatly increased, because as it is not reprogrammable it is immune to any types of attack from viruses or other malicious software, and it also enables the user to use alphanumeric data.

The sphere of application of the invention is obviously in the industrial sector that specialises in the manufacture and/or installation of computing systems and devices as well as communications devices, for the purpose of carrying out electronic commerce operations.

BACKGROUND TO THE INVENTION

With the current state of the art, carrying out monetary operations (or operations of any other type), remotely, has the drawback of being susceptible to unwanted and fraudulent replacement of identities. Therefore, it is necessary to develop devices that make it possible to authenticate the identity of the person concerned in a safe and secure way. One method that has been extensively used up to the present time is the name of the user and a secret password that the user has to show at the other end before the operation begins. This information is sent in coded form in such a way that nobody other than the addressee or recipient can obtain the access code. The problem with this authentication system lies in the fact that as the same access key is always used it is relatively easy to attack. Another more reliable way of authenticating involves the use of an electronic signature. The incorporation of the electronic signature into electronic commerce operations amounts to a major improvement in security, in view of the fact that one single authentication code is not used for any document, because a different signature is generated for each one of them. This signature is a function of the person who gives the order (of the signature code that this person possesses) and of the document itself. This means that although an attacker might manage to intercept a document together with its signature, the attacker will not be able to generate the signature on it for another different document. There are two types of signature, depending on the type of coding that is used: symmetrical or asymmetrical.

As far as the symmetrical coding is concerned, the same code is used to sign and to verify the signature. This means that not only the person who signs the data but also the person who has to verify the data must share the signature code. Therefore, only they will be able to sign or verify the documents. The use of this type of signature is currently widespread, but problems can arise if at a particular moment it is necessary for another person to verify the signature, because this would mean having to make the signature/verification code known to somebody else.

Where the asymmetrical coding is concerned, two supplementary codes are used, one for signing purpose and the other for verification purposes, in such a way that what one signs with one code can be verified with the other code. The fact that two codes are available enables the users to keep one of them secret (the signature code) and make the other code known (the verification code). Furthermore, if the user wishes to make an authentication to somebody, he can sign a block of data with his signature code in such a way that anybody can verify it, using the verification code.

However, these systems are only as secure as the code management is good, that is to say, as long as the signature codes are kept out of reach of any attacker and the mechanism that is used for publishing the verification codes guarantees their integrity. If the signature codes are kept in files that are stored in the computers, there is a risk that someone might illicitly access this information and copy it without the authorised user's knowledge, whether this is done locally or remotely by means of a virus.

Smart cards manage to overcome this problem by isolating the signature codes in a device that is external to the computer, in such a way that the codes can never be extracted from these cards, all that can be done is to pass on items of data so that the smart card can sign them. This amounts to a major breakthrough, because it ensures that nobody can ever steal the signature code.

However, even smart cards can be attacked, albeit in a much more sophisticated way. Such attacks consist of using a virus or a Trojan Horse virus to order the smart card to carry out operations while it is activated without the user observing that anything unusual is going on.

It can be concluded from all of the aforementioned that it is not possible to trust computers to carry out an electronic signature signing process, whether directly while in possession of the signature codes on the hard disk or through the use of smart cards. Therefore, if the signature system is to be made safe and secure, it is necessary to use hardware that cannot be reprogrammed and that is reliable, with the user having the option of being able to display the data that has to be signed and that requires the interaction of the user to carry out the signing operations.

SUMMARY OF THE INVENTION

The system that is associated with the device that is described here, increases the functionality of smart cards, to the extent that the user is able to display these items of data before signing them, for verification purposes, thereby preventing data from being signed that the user does not wish to be signed. That is why this device with a low manufacturing cost makes a substantial improvement to the security of the systems that are based upon an electronic signature, and it can be immediately applied to electronic banking and electronic commerce.

However, the act of using an external device, which cannot be reprogrammed and that also displays the data that have to be signed, with a view to adding the digital signature, has managed to overcome the problem of security, but it needs to have a mechanism for entering the items of data that have to be signed as well as for passing on the resulting signature to the computer. One potential way of overcoming this problem involves making the user manually enter the items of data that have to be signed via the keyboard that is attached to the external device, which will then generate the signature and show it on the display so that the user can key it into the computer. This means that the user has to enter the same data twice, first into the computer and then into the signature device, which often tends to make it rather inefficient, especially when the signature device keyboard is small and awkward to use. Furthermore, it would be possible to use a connection between the signature device and the computer, whether this be with the aid of a cable or using cordless technology, in such a way that the user would only have to check the integrity of the data and order that the signature be generated for it. However, this causes a further complication if the aim is to have a signature device for universal use.

The device that is the object of this description is characterised by the fact that it solves all these problems at the same time, using an easy-to-handle device, which cannot be reprogrammed, with the data to be signed displayed, as well as being equipped with a wireless communications interface to enable it to exchange data with the PC. We can consider that at the present time there are universal standards that are widely used for wireless communication (for example, the standard Bluetooth) and which do not require any kind of further installation or configuration. Once the items of data have been transmitted, the user validates them and the device generates the signature for them, the signature of the person who is giving the order being sent to the computer automatically so that it can be sent to the server of the bank concerned, as well as the data that has to be authenticated.

Both the process of receiving the data via the wireless connection for the data and the process of manually entering this data, enables the user to select currency for the economic size of the transaction that requires the signature.

The signing equipment will be provided with a signature code by cryptography of the asymmetrical code based upon the standard PKI that is known throughout the world. The private code will be safeguarded at all times to make sure that it cannot be read externally, allowing only the public code to be queried.

The device that comes closest to this patent application and that is currently available on the market is the Digipass system by VASCO. This system differs from the one that is explained in this description in that the Digipass system does not support either the automatic reception and processing of alphanumeric documents or the use of several currencies to define the economic units. Furthermore, the Digipass system by VASCO is reprogrammable, which puts it at the risk of a potential attack.

In accordance with a preferred embodiment of the invention, the device concerned is equipped with five key elements, which are indicated below:

A communications system with wireless connection (for example, using the standard Bluetooth);
An alphanumeric display that enables the user to display these data for the transaction to be signed as well as the menus of options that are inherent to the device;
A keyboard that enables the user to interact with the device (enter the Personal Identity Number (PIN), use the data display menus, and either accept or cancel the generation of the signature);
The signature system that processes the format operations for the data received using public code cryptography;
A small rechargeable battery that enables the system to have a power supply for a period of time that is sufficiently long to allow for the signing of several transactions without it being necessary for the battery to be recharged.

BRIEF DESCRIPTION OF THE DRAWINGS

It will be possible to see these and other characteristics and advantages of the invention more clearly from the detailed description shown below of the realisation of a preferred embodiment of the invention, which is merely given by way of illustration and is not meant to be exhaustive or restrictive, with reference to the drawings that are included, in which.

REALISATION OF A PREFERRED EMBODIMENT OF THE INVENTION

Figure 1:
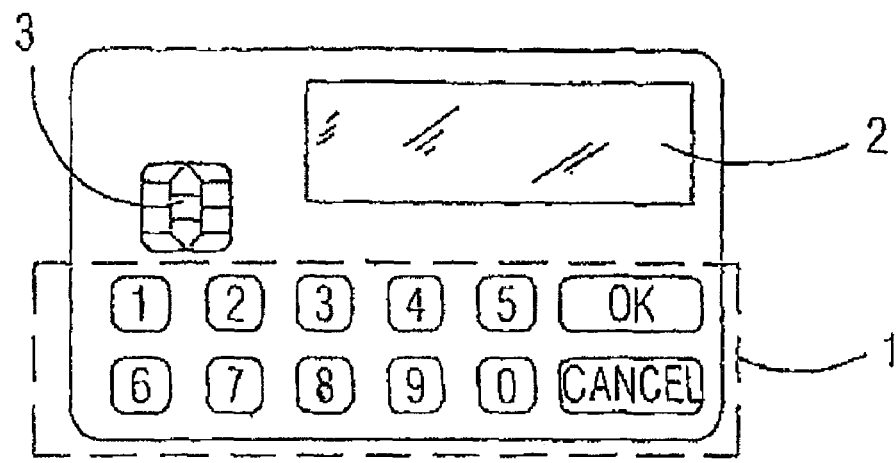
FIG. 1 shows a sketch of the external signature device that is the object of the invention.
Figure 1:
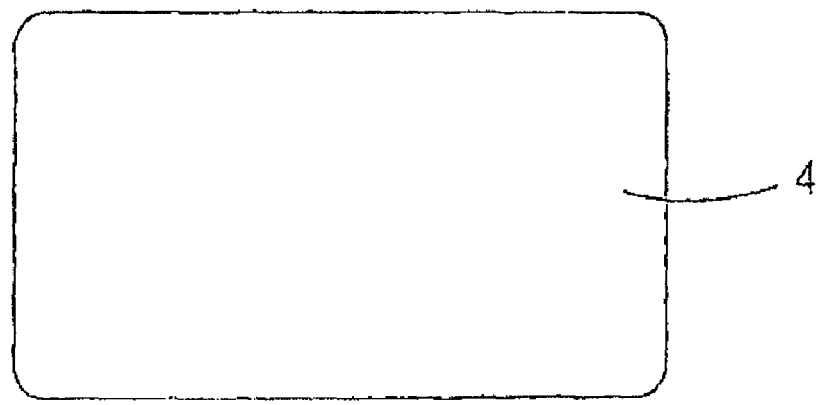

The detailed description of the way to realise a preferred embodiment of this invention is going to be approached below with reference to the drawings in the appendix, whose FIG. 1 shows the general design of the external signature device. It can be seen from this drawing that the device is equipped with a keyboard (indicated with Reference 1) and a display or alphanumeric display (indicated with Reference 2). The device receives its power supply via a rechargeable battery that is fitted into the device itself and that appears in the figure as Reference (4). The device is also equipped with an integrated circuit that contains a cryptographic microprocessor and a wireless communications module, which appears in the figure as Reference (3), that has cryptographic functions with public code cryptography and a wireless communications interface for exchanging data with the user's computer. The aforementioned module (3) can also serve as a recharging point for the battery (4).

Figure 2:
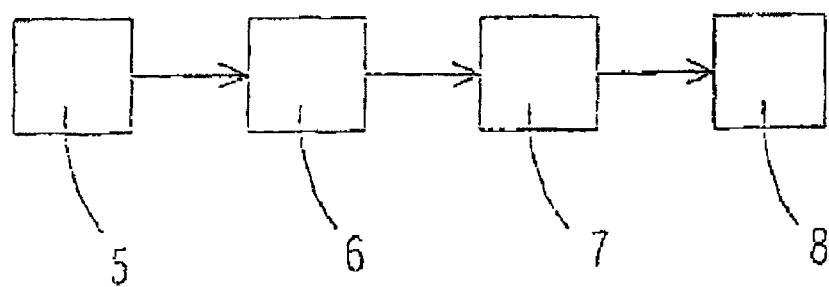
FIG. 2 shows a block diagram that shows the process that is followed with the device that is the object of the invention.

The procedure that is used for signing with this device can be seen in the block diagram shown in FIG. 2. First of all, the user enters the transaction data (5) on the bank website. Once the form has been filled in, the user activates (6) the signature device by entering his Personal Identity Number (PIN) and sending the data (7) on the form from the website to the signature device via the wireless connection, and the transaction data are shown on the latter's display (2) so that the user can confirm that the information is correct. Once the user has accepted the data in the signature device by pressing the button concerned on the device keyboard (1), the signature is sent (8) to the computer via the wireless connection, so that the computer can send the transaction data to the bank with the appropriate format.

In accordance with the above, the system is actually implemented in the following way:

The communications system that is used to exchange data with the PC is the Bluetooth interface, although any other bi-directional communication system that is available in the PC can also be used.

In this sense, there are two possible implementations in the PC on a software level, namely, either as an independent application that implements the transmission system as well as the entire user interface, or as a component that is added to another application (mainly a Web navigator), as is the case of the ActiveXs and the plug-ins, in such a way that it is only necessary to implement the code to carry out the transmission of data. These components would be equipped with a single interface with a transmission function to which the data to be transmitted are passed on as parameters.

As is easy to understand, the device for the invention that is described above, can be applied immediately in electronic banking and electronic commerce, although it can also be used in any other system that is based on an electronic signature when a high level of security is required, without this causing any further complications to the user, as long as the amount of data that has to be signed is relatively low.

It is not considered necessary to make the contents of this description any more extensive for an expert in the subject matter to understand its scope and to appreciate the advantages to be obtained from the invention, as well as for such an expert to understand how to develop and put into practice the purpose of the invention.

However, it must be realised that a preferred embodiment of the invention has been described, so it could be subjected to modifications without this amounting to any basic alteration to the invention, and such modifications could affect either the construction characteristics or the operating characteristics of the assembly, as it is defined in the enclosed appendices.

The invention claimed is:

1. An external signature device for a computer, which cannot be reprogrammed, and which has the capacity for wireless communication with the computer, that can be immediately applied to electronic banking and electronic commerce although it can be used in any other system that is based on an electronic signature, wherein the external signature device comprises:
    an interface for communicating with the computer by means of wireless communication, the interface being configured to allow a bi-directional exchange of data for an electronic signature with any computer that supports the interface;
    a display (2) or an alphanumeric display, for displaying data to be signed;
    a keyboard (1) configured to enable a user to interact with the device;
    a signing system configured to process signing operations for the data that is received from the computer;
    an internal battery (4); and
    an algorithm for generating a public coding signature in compliance with the PKI Standard.

2. The external signature device according to claim 1, wherein the external signature device is activated by entering a Personal Identity Number (PIN).

3. The external signature device according to claim 1, wherein the external signature device is configured to generate the electronic signature for the data that is received and transmit that signature to the computer in such a way that it is transparent to the user once he has authorized it.

4. The external signature device according to claim 3, wherein the data that is received for signing comprises any alphanumeric number.

5. The external signature device according to claim 1, wherein the external signature device is configured to select one currency, from among several, for the amounts involved in the documents that have to be signed and the possibility of selecting one language, from among several, to convey a message to the user.

6. A method for externally and electronically signing data received from a computer, comprising:
    activating an external signature device by entering a personal identity number (PIN);
    sending the data from the computer to the external signature device via wireless communication;
    showing the data received in the external signature device in a display of said external signature device so that a user can confirm that the data is correct;
    accepting the data in the external signature device by pressing a button concerned on the external signature device via a keyboard, generating a public coding signature in compliance with the PKI Standard; and
    sending the signature to the computer via the wireless communication, so that the computer can send the data to a bank in an appropriate format.

* * * * *